United States Patent
Bier et al.

(10) Patent No.: US 6,572,970 B1
(45) Date of Patent: *Jun. 3, 2003

(54) WATER-DISPERSING COATED SHAPED BODIES

(75) Inventors: Peter Bier, Krefeld (DE); Peter Capellen, Krefeld (DE); Jürgen Röhner, Köln (DE); Siegfried Anders, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,844

(22) PCT Filed: Jun. 17, 1999

(86) PCT No.: PCT/EP99/04181

§ 371 (c)(1),
(2), (4) Date: Dec. 18, 2000

(87) PCT Pub. No.: WO00/00297

PCT Pub. Date: Jan. 6, 2000

(30) Foreign Application Priority Data

Jun. 30, 1998 (DE) .......................................... 198 29 081
Jun. 30, 1998 (DE) .......................................... 198 29 082

(51) Int. Cl.⁷ .............................. B32B 9/04; B05D 1/28; B29C 59/00; B29C 47/78
(52) U.S. Cl. .................... 428/411.1; 428/412; 427/428; 264/129; 264/130; 264/211.13; 264/211.18; 264/211.2
(58) Field of Search ........................... 428/412, 411.1; 106/13; 264/129, 130, 134, 211.13, 211.18, 211.2; 427/428

(56) References Cited

U.S. PATENT DOCUMENTS

| 3,738,956 A | | 6/1973 | Glatti et al. ............... 260/41 R |
|---|---|---|---|
| 3,741,803 A | * | 6/1973 | Clayton ........................ 106/13 |
| 3,865,619 A | | 2/1975 | Pennewiss et al. ...... 117/138.8 |
| 4,478,909 A | | 10/1984 | Taniguchi et al. ........... 428/331 |
| 4,576,864 A | | 3/1986 | Krautter et al. ............. 428/328 |
| 5,273,812 A | * | 12/1993 | Oguchi et al. .............. 156/247 |
| 5,468,542 A | * | 11/1995 | Crouch ........................ 427/495 |
| 5,723,175 A | * | 3/1998 | Scholz et al. ................ 427/161 |
| 6,165,256 A | * | 12/2000 | Hayakawa et al. ........... 106/13 |
| 6,455,162 B1 | * | 9/2002 | Pier ............................ 428/412 |

FOREIGN PATENT DOCUMENTS

| DE | 2036986 | 2/1971 |
|---|---|---|
| DE | 2161645 | 6/1973 |
| EP | 473780 | 3/1992 |
| GB | 1277812 | 6/1972 |
| JP | 51-6193 | 1/1976 |
| JP | 51-81877 | 7/1976 |
| WO | WO 98/03607 * | 1/1998 ............ C09K/3/18 |

OTHER PUBLICATIONS

Concise Encyclopedia of Polymer Processing & Applications; Corish; 1992; Pergamon Press; pp. 623–627.*
Database WPI, Section Ch, Week 197649, Derwent Publications Ltd., London, GB; AN 1976–91117X, XP002122116, & JP 51 081877 A (Mitsubishi Monsanto KK), Jul. 17, 1976.

* cited by examiner

*Primary Examiner*—Robert Dawson
*Assistant Examiner*—Michael J Feely
(74) *Attorney, Agent, or Firm*—Joseph C. Gil; James R. Franks

(57) ABSTRACT

A process for the production of coated planar moldings of thermoplastics is disclosed. The process entails extrusion of a molded body, cooling of the molding, applying the aqueous-based coating agent and drying. The coating agent, having a pH value of less than 6, contains a salt of sulfondicarboxylic diester, a water-insoluble oxide of metal or semi-metal and an acid/water mixture. It is applied to at least one surface of the molding immediately after the production of the molding and with the aid of an application roll.

12 Claims, No Drawings

WATER-DISPERSING COATED SHAPED BODIES

CROSS REFERENCE TO RELATED PATENT APPLICATIONS

The present patent application claims the right of priority under 35 U.S.C. §119 (a)–(d) and 35 U.S.C. §365 of International Application No. PCT/EP99/04181, filed Jun. 17, 1999, which was published in German as International Patent Publication No. WO 00/00297 on Jan. 6, 2000, which is entitled to the right of priority of German Patent Application Numbers 198 29 082.9 and 198 29 081.0 each filed on Jun. 30, 1998.

FIELD OF THE INVENTION

The present invention relates to planar mouldings consisting of thermoplastics and provided with a water-spreading coating, to two processes for their production and also to their use.

BACKGROUND OF THE INVENTION

The term "water-spreading" is to be understood to mean the property of a surface for forming a contact angle of below 20 degrees with a drop of water applied on it. A water-spreading coating is accordingly a coating that brings about this property of a surface.

Mouldings with a water-spreading surface have the property that water which gets onto their surface is not concentrated there into drops which are separate from one another but rather that the drops spread out and, when they come into contact, run together to form a closed layer. As a result, an improved reflection of light on the surface that is moistened with water and a better transmission of light in the case of transparent mouldings are achieved. In addition, the dripping of water from the underside of the moulding is rendered difficult. These so-called anti-drop properties which impede the formation of drops are demanded, in particular, for various glazing materials consisting of thermoplastics. In such cases it is desired that condensed water or condensate water deposited thereon does not fall off in the form of drops but rather that it runs off, following the downward gradient of the material, in a closed layer or at least in coherent paths on the lower edge.

Behaviour contrary to that of a water-spreading surface is displayed by the water-repellent surface. On water-repellent surfaces, water which gets onto such a surface is concentrated into drops that are separate from one another.

Numerous attempts to provide water-repellent surfaces of plastics with water-spreading layers are known from the literature. According to DE-A 21 61 645, coatings of this type are produced from a mixed polymer consisting of alkyl esters; hydroxyalkyl esters and quaternary aminoalkyl esters of acrylic or methacrylic acid and methylol ethers of methacrylamide by way of crosslinking agent. They firstly take up water, subject to swelling, and gradually pass over into a water-spreading state. However, as a consequence of the swelling the coating becomes soft and sensitive to mechanical damage.

With a view to improving the mechanical strength of water-spreading coatings, inorganic constituents such as colloidal metal oxides, in particular aluminium oxide, or colloidal silicon dioxide have been worked into the coating compositions (EP-A 7 681 877 or EP-A 7 606 193).

In order to achieve higher mechanical stability, coatings with hydrophilic inorganic constituents in a hydrophilic binding agent have been developed. According to JP-A 76 81 877, polyvinyl-chloride films or polymethyl-methacrylate films are covered with a coating consisting of colloidal aluminium oxide by way of hydrophilising, hard constituent and polyvinyl alcohol and ammonium polyacrylate by way of binding agent. However, in the state swollen with water this coating is also sensitive to mechanical loads.

There have also already been attempts to work wetting-friendly agents into the plastic material itself from which the moulding is produced. For instance, water-spreading coverings for greenhouses and similar damp rooms are produced, according to DE-A 2 017 002, from a plastic that contains surface-active agents such as polyalkylene glycol. The water-spreading effect of this additive is not adequate. The resistance of the plastic to weathering is also impaired.

In JP-A 76 06 193 polymethacrylate sheets with a coating consisting of 95 parts of colloidal silicon dioxide and 5 parts of a dispersion of a hydrophobic acrylic resin are proposed as glazing means. However, the adhesion of this coating is totally unsatisfactory. This is true, above all, with respect to the moist state.

A better adhesion of a water-spreading coating on plastic mouldings is achieved, according to EP-A 51 405, with a covering synthesised from two layers, both layers containing colloidal silicon dioxide, a partially hydrolysed polysiloxane and polyvinyl alcohol by way of binding agent. The ratio of silicon to carbon is greater in the lower layer than in the outer layer.

Generalising, it is possible to note that although a coating having a good water-spreading property can usually be achieved with strongly hydrophilic covering materials, as a rule the coating is too soft in the swollen state. If it is desired to counteract this disadvantage by means of a stronger crosslinking or less hydrophilicity, then the water-spreading effect declines simultaneously with the mechanical sensitivity. Although silicon dioxide and various other oxides of metals or semimetals combine the advantages of great hardness and good wettability by means of water without swelling, they have the disadvantage that they do not adhere at all.

To the extent that use is made of binding agents with a view to anchoring the oxides on the surface of the plastic, the wettability of the oxides and hence the water-spreading effect of the coating declines, and the disadvantages of the binding agents appear: mechanical sensitivity in the case of hydrophilic binding agents, and insufficient spreading of water in the case of hydrophobic binding agents.

In DE-A 34 00 079 it was proposed to bind a water-spreading layer consisting substantially completely of silicon dioxide or other metal oxides of colloidal particle size, which itself has an insufficient adhesive strength on the layer of plastic, onto the water-repellent surface of a plastic moulding in firmly adhering manner by means of an adhesion-promoting layer of an organic polymer having polar groups that is not soluble in water and that is substantially not swellable.

All the named coating agents have the disadvantage that they have to be applied from organic solvents.

The processes for applying the coating agents mentioned in the state of the art onto mouldings consisting of thermoplastics are elaborate.

SUMMARY OF THE INVENTION

With respect to the state of the art that has been mentioned it was therefore a matter of making available a rational coating process which follows the production of the mouldings immediately—i.e., on-line—and with which it is preferably possible to apply an aqueous coating agent even without providing a layer of adhesion promoter. In addition, a uniform and smooth coating of the surface of the moulding is to be guaranteed. The object further underlying the present invention is to make available planar mouldings consisting of thermoplastics and provided with a water-spreading coating and also to make possibilities available for their use.

In accordance with the invention, this object is achieved by means of a process comprising:
(i) preparing a planar thermoplastic molding by means of extrusion;
(ii) cooling said planar thermoplastic molding;
(iii) applying an aqueous based coating composition onto at least one side of the cooled planar thermoplastic molding, said coating being applied by means of an application roll immediately after production of said planar thermoplastic molding; and
(iv) drying the applied coating on said planar thermoplastic molding, wherein said aqueous coating composition comprises,
A) 0.005 to 2 parts by weight of a compound represented by general formula (1),

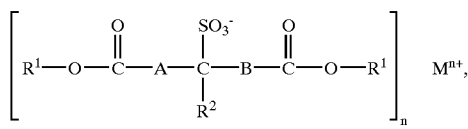

for which,
$R^1$ is a $C_1$–$C_{30}$ hydrocarbon radical,
$R^2$ is hydrogen or a $C_1$–$C_8$ hydrocarbon radical,
A is a single bond or a divalent $C_1$–$C_{30}$ hydrocarbon radical,
B is a single bond or a divalent $C_1$–$C_{30}$ hydrocarbon radical,
n is 1, 2, 3 or 4, and
$M^{n+}$ is a cation having an n-fold positive charge,
B) 1 to 20 parts by weight of at least one water-insoluble oxide of a metal or of a semimetal,
C) 80 to 100 parts by weight of a mixture of an acid and water, more than 90% of which consists of water,
provided that the pH of said aqueous coating composition is less than 6.

In an embodiment of the present invention, the application roll rotates contrary to the direction of transport of the planar thermoplastic molding that is to be coated (referred to herein as "process A").

In accordance with the present invention, there are also provided planar mouldings consisting of thermoplastics and provided with a water-spreading coating that can be obtained in accordance with the above described process, and their use as a constituent part of automobiles, greenhouses, swimming pools, stadia, railway stations, factory buildings, roof coverings, walls, lamp covers, architectural glazings, light cupolas, visors, spectacles, graphics, advertising hoardings, displays, packagings or of panes for means of locomotion of all types.

DETAILED DESCRIPTION OF THE INVENTION

Surprisingly, with the aforementioned so-called on-line process according to the invention it is possible to achieve a particularly uniform coating and an outstandingly even, coated surface on the moulding if the application roll, with the aid of which the aqueous coating composition is applied on the surface of the mouldings, rotates contrary to the direction of transport of the coated moulding.

Moreover, the object according to the invention is achieved through a process for producing planar mouldings consisting of thermoplastics and provided with a water-spreading coating by extrusion, cooling of the mouldings, application and drying of a coating agent onto the mouldings, characterised in that the coating agent is synthesised on an aqueous basis and in that it is applied onto at least one side of the planar moulding immediately after production thereof with the aid of a fluted application roll and is then dried (called "process B" for short in the following) and also through the provision of the planar mouldings consisting of thermoplastics and provided with a water-spreading coating that can be obtained in accordance with this process and their use as a constituent part of automobiles, greenhouses, swimming pools, stadia, railway stations, factory buildings, roof coverings, walls, lamp covers, architectural glazings, light cupolas, visors, spectacles, graphics, advertising hoardings, displays, packagings or of panes for means of locomotion of all types.

Surprisingly, with the aforementioned so-called on-line process according to the invention it is possible to achieve a particularly uniform coating and an outstandingly even, coated surface on the moulding if use is made of a fluted application roll by way of application roll with the aid of which the aqueous coating composition is applied on the surface of the moulding.

A fluted application roll in the sense of the present invention is an application roll that exhibits fine, rib-like elevations or depressions on its surface. The fluted application roll according to the invention is preferably made of steel or rubber and has a diameter preferably from 0.5 to 25 cm, in particularly preferred manner from 0.8 to 2 cm. In particularly preferred manner the roll consists of a high-grade-steel rod with a high-grade-steel spiral with uniform spacings. As such, a Spiral-Rakel (spiral doctor blade) available from BYK-Gardner GmbH, D-82534 Geretsried, Germany or a so-called "K-Stab" (K-rod) available from Erichsen GmbH & Co.KG, D-58675 Hemer, Germany can be employed, for example. Since, in accordance with the invention, the application roll preferably has no drive of its own but is driven only by the continual movement of the planar moulding to be coated, use of the coating is far less trouble-prone in comparison with known process know-how.

The application roll is loaded with the aqueous coating composition, for example with the aid of a metering device, preferably a pump. A collecting vessel is preferably located in the region where loading or application of the coating composition takes place, in which any surplus coating composition accruing is collected and returned to the metering device, so that the process according to the invention can be operated very economically and ecologically.

With the process by means of extrusion according to the invention, sheets, in particularly preferred manner cellular sheets, or film webs are preferably produced by thermoplastic material, preferably plastic granular material, being subjected to conventional shaping by extrusion. In this connection it has proved to be advantageous with the process according to the invention to cool down the mouldings after the extrusion to the application temperature of the aqueous coating composition, preferably to 20 to 80° C., in particularly preferred manner to 40 to 70° C.

With a view to coating it is advantageous that the moulding to be coated runs on at a belt speed that permits the aqueous coating composition to be applied in quantities from 3 to 15 g/m² on the surface of the moulding. After being coated, the moulding passes through a drying-zone in which the coating is dried preferably at room temperature to 80° C., and subsequently through a hardening-zone in which the coating is annealed at 90 to 155° C., preferably at 120 to 150° C.

For the transport of the extruded mouldings the known devices such as conveyor belts with and without haul-off rollers may be employed. Drying and annealing may likewise be effected with known devices, preferably with the aid of hot air, infrared radiators or by indirect action of heat.

After the coating of one surface of the planar moulding other surfaces can also be coated, for example by the moulding being turned and subjected once again to a coating operation.

The coated mouldings are advantageously isolated after being coated to the desired extent.

Suitable by way of coating agents for the process according to the invention are, in particular, coating agents synthesised on an aqueous basis containing A) 0.005 to 2 parts by weight of a compound represented by the general formula (1)

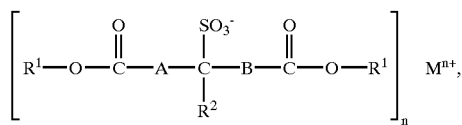

in which
$R^1$ is a hydrocarbon residue with 1 to 30 C atoms,
$R^2$ is hydrogen or a hydrocarbon residue with 1 to 6 C atoms,
A is a single bond or a divalent hydrocarbon residue with 1 to 30 C atoms,
B is a single bond or a divalent hydrocarbon residue with 1 to 30 C atoms,
n is 1, 2, 3 or 4 and
$M^{n+}$ is a cation with a positive charge n, B) 1 to 20 parts by weight of a water-insoluble oxide or of several water-insoluble oxides of a metal or semimetal, C) 80 to 100 parts by weight of a mixture of an acid and water, consisting of more than 90% water, with the proviso that the pH value of the coating agent is less than 6.

In the case of the compounds represented by the general formula (1), which are employed as Component A of the coating agent according to the invention, it is a question of sulfondicarboxylic diesters. These are employed either as free acid (i.e., n=1 and $M^{n+}=H^+$) or as salts. In case the salts are employed, these may be the salts of arbitrary cations. For example, mention may be made of: elemental cations, organic or inorganic molecular cations or organic or inorganic complex cations. Use may also be made of mixtures of various cations.

Preferred compounds according to the general formula (1) are compounds represented by the general formula (2)

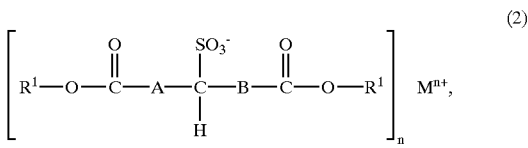

in which
$R^1$ is an aliphatic hydrocarbon residue with 1 to 30 C atoms,
A is a single bond or a divalent aliphatic hydrocarbon residue with 1 to 3 C atoms,
B is a single bond or a divalent aliphatic hydrocarbon residue with 1 to 3 C atoms,
n is 1 or 2 and
$M^{n+}$ is a cation with a positive charge n.

Particularly preferred compounds according to the general formula (1) are compounds represented by the general formula (3)

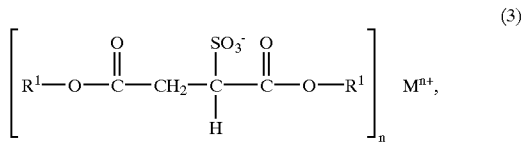

in which
$R^1$ is an aliphatic hydrocarbon residue with 1 to 30 C atoms,
n is 1 or 2 and
$M^{n+}$ is a cation with a positive charge n.

Amongst these, the alkali salts or the alkaline-earth salts or mixtures thereof are preferred. Alkali salts are quite particularly preferred. By way of example, mention may be made of sulfosuccinic-bis-(2-ethylhexyl ester)-sodium salt.

The compounds represented by the general formula (1) can be produced by known processes. Some of them are commercially available.

With a view to producing the coating agents, the compounds represented by the general formula (1) can be employed as pure substance or in the form of a solution in an arbitrary solvent or mixture of solvents. They are preferably employed in the form of a solution. For example, the commercial product Dapro®U99 produced by the Daniel Products Company, Inc., New Jersey, USA may be employed. This product is a solution of 40 g sulfosuccinic-bis-(2-ethylhexyl ester)-sodium salt in 43 g 2-butoxyethanol, 4 g ethanol, 3 g water and 10 g polyethylene-glycol/fatty-acid ester (a mixture based substantially on polyethylene-glycol/oleic-acid ester, polyethylene-glycol/palmitic-acid ester and polyethylene-glycol/stearic-acid ester).

In the case where the compound represented by the general formula (1) is employed in the form of a solution with a view to producing the coating agent according to the invention, this has the consequence that the coating agent contains other substances over and above the three components A, B and C mentioned, namely the solvents of the solution of the compound represented by the general formula (1). The solution of the compound represented by the general formula (1) should preferably have a concentration from 5 to 95 wt.-%, in particular 10 to 90% and, quite particularly preferred, 20 to 60%.

By way of water-insoluble oxides of a metal or semimetal according to the invention, use is preferably made of oxides of elements pertaining to the 3rd or 4th main group or to the 2nd, 3rd, 4th, 5th, 6th, 7th or 8th subgroup of the periodic table of the elements. By way of examples, mention may be made of: aluminium oxide, silicon dioxide, titanium oxide, cerium oxide, zinc oxide, tin oxide, chromium oxide, indium oxide, zirconium oxide and iron oxides as well as pigments, in particular transparent pigments. The oxides according to the invention may contain small quantities of other elements as doping agents.

The use of oxides of a metal or semimetal pertaining to the 3rd or 4th main group of the periodic table of the elements is particularly preferred. By way of example, mention may be made of: aluminium oxide or silicon oxide.

The use of oxides of a metal or semimetal from the 4th main group of the periodic table of the elements is quite particularly preferred. Amongst these, silicon dioxide is most preferred.

The oxides of a metal or semimetal according to the invention are preferably used in the form of a sol—i.e., as an aqueous, colloidal solution—which preferably has a concentration amounting to 10 to 50 mass-% of the metal oxide and has particles which, on average, preferably have diameters measuring less than 5 μm.

The oxide particles in the sol according to the invention are preferably present with an average size of less than 200 nm, in particularly preferred manner in the range from 5 to 100 nm. The particle size is ascertained by means of an ultracentrifuge.

The mixture of an acid and water according to the invention consists of more than 90% water. It preferably consists of more than 95% water, in quite particularly preferred manner more than 98% water. It may contain organic or inorganic acids. Use is preferably made of weak acids. Weak acids are those acids which have a $pK_a$ value of more than 2. In particularly preferred manner use is made of aliphatic carboxylic acids. In quite particularly preferred manner use is made of acetic acid.

The coating agent according to the invention contains 0.005 to 2 parts by weight, preferably 0.01 to 0.5 parts by weight and, particularly preferred, 0.05 to 0.4 parts by weight, of Component A.

The coating agent according to the invention contains 1 to 20 parts by weight, preferably 2 to 20 parts by weight and, particularly preferred, 3 to 8 parts by weight, of Component B.

The coating agent according to the invention has a pH value of less than 6, preferably less than 5.

The coating agents according to the invention may optionally contain other components such as, for example, surfactants and organic solvents with a view to better wetting of the substrate, as well as flow-control agents or defoamers.

Production of the coating agents according to the invention is preferably effected by producing the sol of the oxide of a metal or semimetal that is employed in water or by diluting a commercially available sol with water to the desired concentration in the coating agent according to the invention, subsequently, in advantageous manner, by adjusting a weakly acidic pH, for example by addition of acetic acid, and by adding the quantity of Component A of the coating agent according to the invention that is stipulated for the coating agent.

In advantageous manner the coating agent and optionally also the sol of the oxide of a metal or semimetal that is optionally employed is filtered, so that the respective composition only contains particles with a particle diameter of, preferably, less than 5 μm.

In order to achieve a sufficiently water-spreading and mechanically stable coating of the originally water-repellent plastic mouldings, the aqueous coating compositions should be applied in quantities from 3 to 15, preferably 6 to 12, g/m² of surface, in order that the annealed layer exhibits a layer thickness of, preferably, 0.2 to 0.3 μm.

With the process according to the invention, in particular transparent mouldings consisting of polyacrylates, polymethyl methacrylates, polystyrene, polyvinyl chloride or polycarbonates can be permanently finished with a water-spreading covering that is totally uniform and smooth by employing the coating agents that have been listed. The mouldings that are finished with anti-drop properties in this way are suitable, in particular, as a glass substitute of any type, preferably for roof coverings, walls, lamp covers, architectural glazes, light cupolas, visors, spectacles, graphics, advertising hoardings, displays, packagings and also panes for means of locomotion of all types.

Thermoplastics suitable for coating are described, for example, in Becker/Braun, Kunststoff-Handbuch, Carl Hanser Verlag, Munich, Vienna. The plastics may contain additives.

According to the invention it is possible, in particular, for any polycarbonate to be coated.

Polycarbonates that are suitable in accordance with the invention are both homopolycarbonates and copolycarbonates. A mixture of the polycarbonates that are suitable in accordance with the invention can also be used.

The polycarbonates may be partially or totally replaced by aromatic polyester carbonates.

The polycarbonates may also contain polysiloxane blocks. The production thereof is described in, for example, U.S. Pat. Nos. 3,821,315, 3,189,662 and 3,832,419.

Preferred polycarbonates are those based on bisphenols of the general formula (4)

$$HO-Z-OH \qquad (4)$$

in which Z is a divalent organic residue with 6 to 30 C atoms that contains one or more aromatic groups.

Examples of bisphenols according to the general formula (4) are bisphenols that pertain to the following groups:

dihydroxydiphenyls,
bis-(hydroxyphenyl)-alkanes,
bis-(hydroxyphenyl)-cycloalkanes,
bis-(hydroxyphenyl)-sulfides,
bis-(hydroxyphenyl)-ethers,
bis-(hydroxyphenyl)-ketones,
bis-(hydroxyphenyl)-sulfones,
bis-(hydroxyphenyl)-sulfoxides and
α,α'-bis-(hydroxyphenyl)-diisopropylbenzenes.

Derivatives of the named bisphenols, which are available, for example, as a result of alkylation or halogenation on the aromatic rings of the named bisphenols, are also examples of bisphenols according to the general formula (4).

Examples of bisphenols according to the general formula (4) are, in particular, the following compounds:

hydroquinone,
resorcinol,
4,4'-dihydroxydiphenyl,
bis-(3,5-dimethyl-4-hydroxyphenyl)-methane,
bis-(3,5-dimethyl-4-hydroxyphenyl)-sulfone,
1,1-bis-(3,5-dimethyl-4hydroxyphenyl)-p/m-diisopropylbenzene,
1,1-bis-(4-hydroxyphenyl)-1-phenylethane,
1,1-bis-(3,5-dimethyl-4-hydroxyphenyl)-cyclohexane,
1,1-bis-(4-hydroxyphenyl)-3-methylcyclohexane, 1,1-bis-(4-hydroxyphenyl)-3,3-dimethylcyclohexane,
1,1-bis-(4-hydroxyphenyl)-4-methylcyclohexane,
1,1-bis-(4-hydroxyphenyl)-cyclohexane,
1,1-bis-(4-hydroxyphenyl)-3,3,5-trimethylcyclohexane,
2,2-bis-(3,5-dichloro-4-hydroxyphenyl)-propane,
2,2-bis-(3-methyl-4-hydroxyphenyl)-propane,
2,2-bis-(3,5-dimethyl-4-hydroxyphenyl)-propane,
2,2-bis-(4-hydroxyphenyl)-propane (i.e., bisphenol A),
2,2-bis-(3-chloro-4hydroxyphenyl)-propane,
2,2-bis-(3,5-dibromo-4-hydroxyphenyl)-propane,
2,4-bis-(4-hydroxyphenyl)-2-methylbutane,
2,4-bis-(3,5-dimethyl-4-hydroxyphenyl)-2-methylbutane,
α,α'-bis-(4-hydroxyphenyl)-o-diisopropylbenzene,
α,α'-bis-(4-hydroxyphenyl)-m-diisopropylbenzene (i.e., bisphenol M) and
α,α'-bis-(4-hydroxyphenyl)-p-diisopropylbenzene.

Particularly preferred polycarbonates are the homopolycarbonate based on bisphenol A, the homopolycarbonate based on 1,1-bis-(4-hydroxyphenyl)-3,3,5-trimethylcyclohexane and the copolycarbonates based on bisphenol A and 1,1-bis-(4-hydroxyphenyl)-3,3,5-trimethylcyclohexane.

The bisphenols according to the general formula (4) that have been described may be produced in accordance with known processes, for example from the corresponding phenols and ketones.

Processes for producing the named bisphenols are described in, for example, the monograph by H. Schnell entitled "Chemistry and Physics of Polycarbonates", Polymer Reviews, Volume 9, pp 77–98, Interscience Publishers, New York, London, Sydney, 1964 and in U.S. Pat. No. 3,028,635, in U.S. Pat. No. 3,062,781, in U.S. Pat. No. 2,999,835, in U.S. Pat. No. 3,148,172, in U.S. Pat. No. 2,991,273, in U.S. Pat. No. 3,271,367, in U.S. Pat. No. 4,982,014, in U.S. Pat. No. 2,999,846, in DE-A 1 570 703, in DE-A 2 063 050, in DE-A 2 036 052, in DE-A 2 211 956, in DE-A 3 832 396 and in FR-A 1 561 518, as well as in the Japanese published applications having application numbers 62039/1986, 62040/1986 and 105550/1986.

The production of 1,1-bis(4-hydroxyphenyl)-3,3,5-trimethylcyclohexane is described in, for example, U.S. Pat. No. 4,982,014.

Polycarbonates may be produced in accordance with known processes. Suitable processes for producing polycarbonates are, for example, production from bisphenols with phosgene in accordance with the phase-interface process or from bisphenols with phosgene in accordance with the process in homogeneous phase, the so-called pyridine process, or from bisphenols with carbonic esters in accordance with the melt transesterification process. These production processes are described in, for example, H. Schnell, "Chemistry and Physics of Polycarbonates", Polymer Reviews, Volume 9, pp 31–76, Interscience Publishers, New York, London, Sydney, 1964. The production processes that have been mentioned are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K Kirchner and P. R. Müller, "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117 to 299.

The melt transesterification process is described, in particular, in H. Schnell, "Chemistry and Physics of Polycarbonates", Polymer Reviews, Volume 9, pp 44–51, Interscience Publishers, New York, London, Sydney, 1964 and also in DE-A 1 031 512, in U.S. Pat. No. 3,022,272, in U.S. Pat. No. 5,340,905 and in U.S. Pat. No. 5,399,659.

Carbonic diesters that can be employed for producing polycarbonates in accordance with the melt transesterification process are, for example, diaryl esters of carbonic acid, with the two aryl residues preferably each having 6 to 14 C atoms. The diesters of carbonic acid based on phenol or alkyl-substituted phenols—that is, for example, diphenyl carbonate or dicresyl carbonate—are preferably employed.

The polycarbonates that are suitable in accordance with the invention preferably have a weight-average molar mass ($\overline{M}_w$), which can be determined by, for example, ultracentrifugation or by scattered-light measurement, from 10,000 to 200,000 g/mole. In particularly preferred manner they have a weight-average molar mass from 12,000 to 80,000 g/mole.

The mean molar mass of the polycarbonates according to the invention can, for example, be adjusted in known manner by means of an appropriate quantity of chain terminators.

Suitable chain terminators are both monophenols and monocarboxylic acids. Suitable monophenols are, for example, phenol, p-chlorophenol, p-tert.-butylphenol, cumylphenol or 2,4,6-tribromophenol, as well as long-chain alkylphenols such as, for example, 4-(1,1,3,3-tetramethylbutyl)-phenol or monoalkylphenols or dialkylphenols with a total of 8 to 20 C atoms in the alkyl substituents, such as, for example 3,5-di-tert.-butylphenol, p-tert.-octylphenol, p-dodecylphenol, 2-(3,5-dimethylheptyl)-phenol or 4-(3,5-dimethylheptyl)-phenol. Suitable monocarboxylic acids are benzoic acid, alkylbenzoic acids and halobenzoic acids.

Preferred chain terminators are phenol, p-tert.-butylphenol, 4-(1,1,3,3-tetramethylbutyl)-phenol and cumylphenol.

The quantity of chain terminators preferably amounts to between 0.5 and 10 mole-%, relative to the sum of the bisphenols employed in each instance.

The polycarbonates that are suitable in accordance with the invention may be branched in known manner and, to be specific, preferably through the incorporation of trifunctional branching agents or branching agents of higher functionality. Suitable branching agents are, for example, those with three, or more than three, phenolic groups or those with three, or more than three, carbonic-acid groups.

Suitable branching agents are, for example, phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl) phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-terephthalic ester, tetra-(4-hydroxyphenyl)-methane, tetra-(4-(4-hydroxyphenylisopropyl)-phenoxy)-methane and 1,4-bis-(4',4"-dihydroxytriphenyl)-methylbenzene, as well as 2,4-dihydroxybenzoic acid, trimesic acid, cyanuric chloride, 3,3-bis-(3-methyl-4-hydroxyphenyl)-2-oxo-2,3-dihydroindole, trimesic trichloride and α,α,α"-tris-(4-hydroxyphenol)-1,3,5-triisopropylbenzene.

Preferred branching agents are 3,3-bis-(3-methyl-4-hydroxyphenyl)-2-oxo-2,3-dihydroindole and 1,1,1-tris-(4-hydroxyphenyl)-ethane.

The quantity of the branching agents to be optionally employed preferably amounts to 0.05 mole-% to 2 mole-%, relative to moles of bisphenols employed.

In the case where the polycarbonate is produced in accordance with the phase-interface process, the branching agents may, for example, be submitted with the bisphenols and the chain terminators in the aqueous alkaline phase or may be added, dissolved in an organic solvent, together with the carbonic-acid derivatives. In the case of the transesterification process, the branching agents are preferably metered together with the dihydroxy aromatics or bisphenols.

With a view to modifying the properties, conventional additives may be admixed to the polycarbonates according to the invention and/or applied onto the surface of the mouldings. Conventional additives are, for example: fillers, reinforcing substances, stabilisers (for example, UV stabilisers, thermal stabilisers, gamma-ray stabilisers), antistatic agents, flow aids, mould-release agents, fire-protection agents, dyestuffs and pigments. The named additives and other suitable additives are described in, for example, G̈achter, Müller, Kunststoff-Additive, 3rd Edition, Hanser-Verlag, Munich Vienna, 1989.

Other polymers may be admixed to the polycarbonates according to the invention, as a result of which so-called polymer blends are obtained. For example, blends may be produced from the polycarbonates according to the invention and polyolefins, in particular ABS polymers.

The invention is elucidated in more detail below in the following examples.

Production of the Coating Agents

Coating Agent A

To 416.7 g of completely desalinated water there are added, subject to stirring, 83.3 g silica sol (Levasil® 300F, produced by Bayer AG) which had previously been filtered through a 5 μm filter. The aqueous suspension is then adjusted with 98-% acetic acid to a pH value of 4.8 and is mixed with 1.5 g Dapro® U99 (a solution of 40 g sulfosuccinic-bis-(2-ethylhexyl ester)-sodium salt in 43 g 2-butoxyethanol, 4 g ethanol, 3 g water and 10 g polyethylene-glycol/fatty-acid ester (a mixture based substantially on polyethylene-glycol/oleic-acid ester, polyethylene-glycol/palmitic-acid ester and polyethylene-glycol/stearic-acid ester).

Levasil® 300F is an anionically stabilised silica sol produced by Bayer AG having a mean particle size from 7 to 8 nm or a specific surface of 300 m$^2$/g. Levasil® 300F has a solids content of 30 mass-% and a pH value of about 9.8. It contains a small quantity amounting to ≦0.2 wt.-% of formaldehyde in order to counter attack by micro-organisms.

Coating Agent B

Production is effected in a manner analogous to that for coating agent A. Instead of Dapro® U99, however, there are added 0.675 g sulfosuccinic-bis-(2-ethylhexyl ester)-sodium salt in 0.825 g 2-butoxyethanol.

Coating Agent C

Production is effected in a manner analogous to that for coating agent A. Instead of the named solution, however, there are added 0.621 g sulfosuccinic-bis-(2-ethylhexyl ester)-sodium salt, 0.054 g polyethylene glycol (number-average molar mass: 1,000) in 0.754 g 2-butoxyethanol and 0.0705 g ethanol.

Coating Agent D

Production is effected in a manner analogous to that for coating agent C. Instead of the polyethylene glycol there are added 0.062 g polyethylene-glycol/fatty-acid ester (a mixture based substantially on polyethylene-glycol/oleic-acid ester, polyethylene-glycol/palmitic-acid ester and polyethylene-glycol/stearic-acid ester).

Coating of Polycarbonate Cellular Sheets

Cellular sheets consisting of a branched aromatic polycarbonate (relative solution viscosity 1.315, measured in respect of a solution of 0.5 g polycarbonate in 100 ml methylene chloride at room temperature), such as are used for the construction of greenhouses, were each coated on one side with the coating agents A to D in a flow-coating process and subsequently dried at 130° C. for 0.5 h. The layer thicknesses amounted to around 0.3 μm (thickness gauge ETA-SD-30 manufactured by ETA-Optik; interference method). The coatings had no surface faults and showed no interference pattern. The wetting with water was uniform. The contact angle of the water was below 1°.

Steam Test (100° C.)

As a further test, the steam test was carried out. In this connection the cellular sheets were exposed to a sealed water-vapour atmosphere at a temperature of 100° C. An observation is made as to when the water-spreading effect disappears and the first formation of drops occurs.

Result

| Coating agent | Lifespan of the coating in the steam test |
|---|---|
| Example A | over 3 hours |

Model-greenhouse Test

The coated polycarbonate cellular sheets were attached at an angle of 60°, with the coated side down, to the ceiling of a model greenhouse, so that the water-spreading effect could be compared by observing the formation of droplets. Water was evaporated in the model greenhouse by means of a heating source, so that a temperature of 50° C. and a humidity of 100% set in.

The sheets were left for 6 h under these conditions and were subsequently heated for 4 h in a dry heating cabinet at 40° C. Subsequently the procedure was repeated in the model greenhouse and in the heating cabinet, always in alternating manner, for such time until the water-spreading effect disappeared (evident from the formation of drops on the sheet).

Result

| | Coating | Lifespan of the coating (in cycles) |
|---|---|---|
| Example 1 | A | >80 |
| Example 2 | B | >80 |
| Example 3 | C | >80 |
| Example 4 | D | >80 |
| Example 5 | copolyacrylate/silica sol | >80 |
| Example 6 | polyvinylpyrrolidone/silica sol | 15 |
| Example 7 | surfactant/silica sol | 15 |

Examples Relating to On-line Coating (According to "Process A")

Granular, branched bisphenol A polycarbonate (relative solution viscosity 1.315, measured in respect of a solution of 0.5 g polycarbonate in 100 ml methylene chloride at room temperature) was extruded to form cellular sheets having a thickness of 6 mm and a specific weight of 1.3 kg/m$^2$ using a single-screw extruder at 290° C. After calibration, the aqueous coating having the composition according to Example 1 was applied with an Optiroller manufactured by Bürkle (roll coater SAL), which possessed a rubberised reverse-running application roll having a hardness of 50 Shore, onto the cellular sheet. The speed of the roll amounted to 8 m/min with a roll thickness of 238 mm. The quantity applied was regulated via a pump. After a short drying-distance of 1.5 m, annealing of the coating was effected. The cellular sheet was then sawn up into individual sheets. The coated sheets exhibit a high degree of brilliance in comparison with the original sheets and possess an excellent water-spreading property. The coating cannot be detached in the adhesive-tape test (Tesafilm test). Even after 80 cycles, no change in the spreading of water was detected in the model greenhouse.

The results of a number of trials are listed below.

| Examples | Application temperature (° C.) | Quantity applied (g/m²) | Annealing Type | Annealing Time (min) | Annealing Temp. (° C.) | Appearance of the sheets | Spreading of water | Model-greenhouse test (cycles) |
|---|---|---|---|---|---|---|---|---|
| 8 | RT | 10 | ambient air | 4 | 120 | high brilliance | very good | >80 |
| 9 | RT | 7.2 | ambient air | 4 | 120 | high brilliance | very good | >80 |
| 10 | RT | 10 | ambient air | 4 | 94 | high brilliance | very good | >80 |
| 11 | RT | 10 | infra red | 2 | 138 | high brilliance | very good | >80 |

RT = room temperature

Examples Relating to On-line Coating (According to "Process B")

Granular, branched bisphenol A polycarbonate (relative solution viscosity 1.315, measured in respect of a solution of 0.5 g polycarbonate in 100 ml methylene chloride at room temperature) was extruded to form cellular sheets having a thickness of 6 mm and a specific weight of 1.3 kg/m² using a single-screw extruder at 290° C. After calibration, the aqueous coating having the composition according to Example 1 was applied with a metering pump and a tracking fluted steel roll at 60° C. The quantity applied was regulated via a metering pump. The application by pump was effected in planar manner immediately upstream of the roll. The thickness of the roll amounted to 10 mm.

After a drying-distance of about 50 cm, annealing of the coating was effected for 4 minutes in a circulating-air stretch at a temperature of up to 130° C. The cellular sheet was then sawn up into individual sheets. The coated sheets exhibit an improved brilliance in comparison with the original sheets and possess an excellent water-spreading property. The coating cannot be detached in the adhesive-tape test (Tesafilm test). Even after 80 cycles, no change in the spreading of water was detected in the model greenhouse.

The results of a number of trials are listed below:

| Example | Concentration of coating agent[1] | Number of flutes per inch | Quantity applied (g/m²) | Appearance of the sheets | Spreading of water | Model-greenhouse test (cycles) |
|---|---|---|---|---|---|---|
| 12 | 5 | 16 | 7.4 | good brilliance | very good | >80 |
| 13 | 5 | 16 | 4.6 | good brilliance, slightly iridescent | very good | >80 |
| 14 | 10 | 16 | 4.6 | good brilliance | very good | >80 |
| 15 | 10 | 32 | 4.6 | good brilliance | very good | >80 |

[1]"Concentration of the coating agent" means the content of all substances in the coating agent that are not water, in % by mass.

What is claimed is:

1. A process for producing a planar thermoplastic molding having a water-spreading coating on at least one side of said molding, said process comprising:
   (i) preparing a planar thermoplastic molding by means of extrusion;
   (ii) cooling said planar thermoplastic molding;
   (iii) applying an aqueous based coating composition onto at least one side of the cooled planar thermoplastic molding, said coating being applied by means of an application roll immediately after production of said planar thermoplastic molding;
   (iv) drying the applied coating on said planar thermoplastic molding at a temperature from room temperature to 80° C.; and
   (v) annealing the dried coating of step (iv) at a temperature of 90° C. to 155° C.,
wherein said aqueous coating composition comprises,
   A) 0.005 to 2 parts by weight of a compound represented by general formula (1),

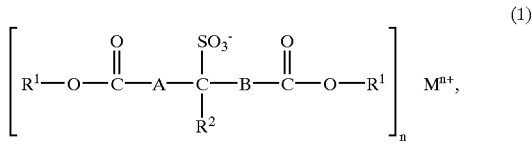

for which,
   $R^1$ is a $C_1$–$C_{30}$ hydrocarbon radical,
   $R^2$ is hydrogen or a $C_1$–$C_6$ hydrocarbon radical,
   A is a single bond or a divalent $C_1$–$C_{30}$ hydrocarbon radical,
   B is a single bond or a divalent $C_1$–$C_{30}$ hydrocarbon radical,
   n is 1, 2, 3 or 4, and
   $M^{n+}$ is a cation having an n-fold positive charge,
   B) 1 to 20 parts by weight of at least one water-insoluble oxide of a metal or of a semimetal,
   C) 80 to 100 parts by weight of a mixture of an acid and water, more than 90% of which consists of water, provided that the pH of said aqueous coating composition is less than 6.

2. The process of claim 1 wherein said planar thermoplastic molding is one of a sheet and a film web.

3. The process of claim 1 wherein said planar thermoplastic molding consists of a transparent thermoplastic.

4. The process of claim 1 wherein said planar thermoplastic molding consists of polycarbonate.

5. The process of claim 1 wherein said aqueous coating composition is applied in quantities from 3 to 15 g/m² onto the surface of said planar thermoplastic molding.

6. The process of claim 1 wherein after extrusion step (i) the planar thermoplastic molding is cooled in step (ii) to the temperature at which the aqueous coating composition is applied in step (iii).

7. The process of claim 6 wherein the planar thermoplastic molding is cooled to 20 to 80° C. in step (ii).

8. The process of claim 1 wherein said application roll is a fluted application roll.

9. The process of claim 8 wherein said fluted application roll is made of one of rubber and steel.

10. The process of claim 1 wherein said application roll is driven only by a continual movement of said planar thermoplastic molding.

11. The process of claim 1 wherein said application roll rotates contrary to the direction of transport of said planar thermoplastic molding.

12. The thermoplastic molding, having a water-spreading coating on at least one side, prepared by the process of claim 1.

* * * * *